US006153305A

United States Patent [19]

Uemura et al.

[11] Patent Number: 6,153,305

[45] Date of Patent: Nov. 28, 2000

[54] RECORDING SHEET FOR INK-JET RECORDING AND INK JET RECORDING METHOD

[75] Inventors: Hiroyuki Uemura; Koji Takemura; Ichiro Tsuchiya, all of Hino, Japan

[73] Assignee: Konica Corporation, Japan

[21] Appl. No.: 09/013,786

[22] Filed: Jan. 26, 1998

[30] Foreign Application Priority Data

| | | | |
|---|---|---|---|
| Jan. 31, 1997 | [JP] | Japan | 9-018371 |
| Mar. 25, 1997 | [JP] | Japan | 9-071439 |

[51] Int. Cl.$^7$ ..... B32B 9/02

[52] U.S. Cl. ..... 428/478.2; 428/195

[58] Field of Search ..... 428/195, 411.1, 428/500, 520, 913, 914, 704, 331, 478.2

[56] References Cited

U.S. PATENT DOCUMENTS

| | | | |
|---|---|---|---|
| 4,770,934 | 9/1988 | Yamasaki et al. | 428/331 |
| 5,418,078 | 5/1995 | Desie et al. | 428/704 |
| 5,662,997 | 9/1997 | Onishi et al. | 428/331 |
| 5,700,582 | 12/1997 | Sargeant et al. | 420/476.6 |

FOREIGN PATENT DOCUMENTS

| | | |
|---|---|---|
| 0445327 | 9/1991 | European Pat. Off. . |
| 0701902 | 3/1996 | European Pat. Off. . |
| 0749845 | 12/1996 | European Pat. Off. . |
| 2166063 | 4/1996 | United Kingdom . |

OTHER PUBLICATIONS

European Search Report EP 98 30 0666.

*Primary Examiner*—Bruce H. Hess
*Assistant Examiner*—Michael E. Grendzynski
*Attorney, Agent, or Firm*—Jordan B. Bierman; Bierman, Muserlian and Lucas

[57] ABSTRACT

Disclosed is a recording sheet for ink-jet recording comprising a support, and provided on one side of the support, an ink receiving layer, wherein the layer swelling amount of the ink receiving layer is 20 to 500 cc/m$^2$, and the layer solubility time of the ink receiving layer is 10 minutes or more.

12 Claims, No Drawings

RECORDING SHEET FOR INK-JET RECORDING AND INK JET RECORDING METHOD

FIELD OF THE INVENTION

The present invention relates to a recording sheet for ink-jet recording, and to an ink-jet recording method.

BACKGROUND OF THE INVENTION

An ink jet recording apparatus (hereinafter referred to also as an ink-jet printer) enables high speed recording with low noise and makes it easy to form a color image by employing plural ink nozzles. Recently, the ink-jet recording printer is rapidly spreading as an image formation output apparatus for a computer.

Further, an ink-jet printer developed for a full color recording can record, on a transparent film or glossy resin-covered paper, a high quality color image corresponding to a photographic image according to photographic procedure, and record characters, figures, a color original or design image in which a high quality image corresponding to a photographic image is required.

As Ink for ink jet recording, a water based ink having, as main components, water and a water soluble organic solvent has been used in view of safety or recording properties, so that ink clogging of nozzles is minimized. As a recording sheet used for ink-jet recording system, conventionally, paper or a recording sheet referred to as an ink-jet recording paper wherein a porous ink receiving layer is provided on a support has been used.

However, the above-mentioned ink-jet recording sheets result in much ink blurring and low glossiness, and could not be employed for the above-mentioned field wherein high quality image is required. The porous ink absorbing layer coated on a glossy resin-covered paper has a rough surface and causes light scattering, resulting in the problem that transparency and glossiness are lowered. The non-porous ink receiving layer increases light transmittance, but there was the problem that ink after ink recording remains without being dried on the surface for a long time, and requires a long drying time.

In order to overcome the above-mentioned problems, there is proposed a water soluble polymer containing ink receiving layer swelled or dissolved by a water based ink. For example, an ink receiving layer comprised of gelatin having a specific pH is proposed in Japanese Patent O.P.I. Publication No. 62-263084, an ink-jet recording sheet, which is obtained by coating a gelatin layer on a support to be in gel state and then drying it by a cold drying method, is proposed in Japanese Patent O.P.I. Publication No. 6-64306, and an ink receiving layer containing polyethylene oxide with an average molecular weight of $5–10^4$ or more is proposed in Japanese Patent O.P.I. Publication No. 62-214985.

In order to obtain water resistance property to an ink receiving layer, use of a cross-linking agent is proposed. For example, an ink receiving layer comprised of polyvinyl alcohol with a saponification degree of 50 to 90 mol % and its cross-linking agent is proposed in Japanese Patent O.P.I. Publication No. 60-234879, and an ink receiving layer comprised of barium sulfate, gelatin and a gelatin hardener is proposed in Japanese Patent O.P.I. Publication No. 3-2114873.

In the ink receiving layer comprised of a specific water soluble polymer and a specific cross-linking agent as in the above literatures, ink absorption or water resistance is improved to some degree, but the ink absorption is not necessarily satisfactory. When printed at high speed and high resolving power by a printer jetting a large amount of jetting ink, the above mentioned techniques produce density unevenness or streak unevenness due to ink aggregation caused by insufficient ink absorption, resulting in poor image quality, and the jetting ink remains undry on an ink receiving layer for a long time.

When printed employing a specific ink-jet printer and a specific ink with high ink jetting amount, it has been proved that only the above mentioned techniques produce image blurring under high humidity and markedly lower image light fastness.

SUMMARY OF THE INVENTION

An object of the present invention is to provide a recording sheet for ink-jet recording and an ink-jet recording method which can provide excellent ink absorption, excellent ink drying property, excellent water resistance, and a high quality image without any density unevenness or streak unevenness, employing a high speed printer jetting a large amount of jetting ink. Another object of the present invention is to provide a recording sheet for ink-jet recording and an ink-jet recording method which can reduce image blurring under conditions of high humidity and provide excellent image light fastness, employing a high speed printer jetting a large amount of jetting ink.

DETAILED DESCRIPTION OF THE INVENTION

The above objects of the invention can be attained by the following:

1. a recording sheet for ink-jet recording comprising a support, and provided on one side of the support, an ink receiving layer, wherein the layer swelling amount of the ink receiving layer is 20 to 500 $cc/m^2$, and the layer solubility time of the ink receiving layer is 10 minutes or more,
2. the recording sheet for ink-jet recording of item 1, wherein the ink receiving layer contains gelatin and a water soluble polymer other than gelatin,
3. the recording sheet for ink-jet recording of item 1 or 2, wherein the ink receiving layer further contains basic latex and/or at least one selected from cationic water soluble polymers,
4. the recording sheet for ink-jet recording of item 1, 2 or 3, wherein the ink receiving layer further contains a fluorine containing surfactant,
5. the recording sheet for ink-jet recording of item 1, 2, 3 or 4, wherein the ink receiving layer further contains a cross-linking agent,
6. the recording sheet for ink-jet recording of item 1, 2, 3, 4 or 5, wherein the cross-linking agent is at least one selected from triazine compounds and carbamoyl pyridinium compounds,
7. the recording sheet for ink-jet recording of item 6, wherein the carbamoyl pyridinium compound is represented by the following formula I:

formula I

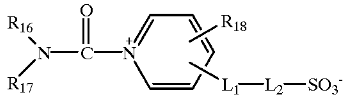

wherein $R_{16}$ and $R_{17}$ independently represent an alkyl group or an aryl group, provided that $R_{16}$, and $R_{17}$ may combine with each other to form a ring; $R_{18}$ represents a hydrogen atom or a substituent; and $L_1$ and $L_2$ independently represent a divalent linkage group, 8. the recording sheet for ink-jet recording of item 1, 2, 3, 4, 5, 6 or 7, wherein the coating amount of the ink receiving layer is 8 to 100 mg/$m^2$,
9. the recording sheet for ink-jet recording of item 1, 2, 3, 4, 5, 6, 7 or 8, wherein the support is a film or a resin-covered paper in which both sides of paper are covered with a resin,
10. the recording sheet for ink-jet recording of item 1, 2, 3, 4, 5, 6, 7, 8 or 9, wherein the sheet has a Taber stiffness of 1 to 15 g.cm,
11. an ink jet recording method comprising the step of jetting ink on the recording sheet of item 1, 2, 3, 4, 5, 6, 7, 8, 9 or 10, wherein the ink contains 40 weight % or more of water, or
12. the ink jet recording method of item 11, wherein the maximum jetting amount of the ink is 40 to 60 g/$m^2$.

The present invention will be detailed below.

The layer swelling amount in the invention herein referred to is obtained by subtracting the thickness (Hd) of the ink receiving layer before swelling from the thickness (Hw) of the ink receiving layer after swelling, wherein Hw represents the thickness of the layer swelled after the ink jet recording sheet is allowed to stand at 23° C. and 55% RH, and then, immersed in 20° C. distilled water for 3 minutes to swell the ink receiving layer, and Hd represents the thickness of the ink receiving layer after the ink jet recording sheet is allowed to stand at 23° C. and 55% RH, and before swelling.

In the invention, there are various methods of measuring the thickness of the ink receiving layer before or after immersed in distilled water. For example, there is a method in which, after an ink jet recording sheet sample is immersed in distilled water at a given temperature for a given time, and then frozen in liquid nitrogen, the swelled layer thickness of the ink receiving layer of the sample is measured by observing a section of the frozen sample with a scanning electron microscope (SEM). There is also a method in which, after an ink jet recording sheet sample is immersed in distilled water at a given temperature for a given time to swell the ink receiving layer, the swelling process is observed by touching the swelled layer continually with a pressured needle to measure the thickness of the ink receiving layer before or after swelling.

The layer dissolving time of the ink receiving layer in the invention herein referred to implies the time from when distilled water is dropped on an ink receiving layer of an ink jet recording sheet at 23° C. and 55 % RH to swell the layer, to when the swelled layer is dissolved in the distilled water to be the initial dry thickness of the ink receiving layer while touching the swelled layer continually with a needle with a 0.2 g load applied, the tip end surface of the needle having a 3 mm diameter plane, whereby the thickness of the layer is measured.

It has been proved that the ink receiving layer in the invention, having a layer swelling amount of 20 to 500 cc/$m^2$, and a layer solubility time of 10 minutes or more, can attain the objects of the invention, and can provide excellent ink absorption, excellent ink drying property, excellent water resistance, and a high quality image without any density unevenness or streak unevenness, and further provides surprising results of reducing image blurring under high humidity and improving image light fastness. The reason that the ink receiving layer in the invention, having a layer swelling amount of 20 cc/$m^2$ or more and a layer solubility time of 10 minutes or more can attain the objects of the invention is not clear, but the layer having a layer swelling amount of 20 cc/$m^2$ or more is considered to obtain a high quality image with no density unevenness and with no streak unevenness, since the layer has a sufficient ink absorption capability and a high ink absorption speed.

The layer dissolving time of 10 minutes or more provides sufficient water resistance of the ink receiving layer, and the ink solvent in the ink receiving layer dries without causing tackiness. In the ink receiving layer having a high layer swelling amount and a long layer dissolving time, the layer is fixed, and the dye of the ink uniformly spreads in the layer during printing. Therefore, such an ink receiving layer is considered to minimize image blurring and improve light fastness.

The layer swelling amount of the ink receiving layer in the invention is 20 to 500 cc/$m^2$, and preferably 30 to 300 cc/$m^2$. When the layer swelling amount is less than 20 cc/$m^2$, the ink receiving capability is insufficient, and therefore, the objects of the invention cannot be attained. When the layer swelling amount exceeds 500 cc/$m^2$, ink oozes on the ink receiving layer, resulting in poor image quality.

The layer dissolving time of the ink receiving layer in the invention is 10 minutes or more, and preferably 20 minutes or more. Especially preferably, the ink receiving layer is not dissolved in distilled water. When the layer dissolving time is less than 10 minutes, the water resistance of the ink receiving layer is insufficient, and therefore, the objects of the invention cannot be attained.

The layer swelling amount and layer dissolving time of the ink receiving layer in the invention can be adjusted by kinds or coating amount of the binder used, kinds or coating amount of the cross-linking agent used, or kinds or coating amount of other additives used. The coating amount of the binder, the cross-linking agent or other additives may be different depending on their kinds used, but the increased coating amount of the binder increases the layer swelling amount, and the increased coating amount of the cross-liming agent or other additives extends the layer dissolving time of the ink receiving layer. In the invention, they are preferably adjusted by kinds or coating amount of the binder or kinds or coating amount of the cross-linking agent.

The above described binder includes gelatin, a water soluble polymer other than gelatin (hereinafter referred to also as the water soluble polymer in the invention), latexes, and polyurethanes. The ink receiving layer preferably contains gelatin or a water soluble polymer other than gelatin, in view of its high ink absorption and drying property.

As gelatin preferably used in the invention, any gelatin made from animal collagen can be used, but gelatin made from pig skin, cow skin or cow bone collagen is preferable. The kind of gelatin is not specifically limited, but lime-processed gelatin, acid processed gelatin or gelatin derivatives (for example, gelatin derivatives disclosed in Japanese Patent Publication Nos. 38-4854/1962, 39-5514/1964, 40-12237/1965, 42-26345/1967 and 2-13595/1990, U.S. Pat. Nos. 2,525,753, 2,594,293, 2,614,928, 2,763,639, 3,118,766, 3,132,945, 3,186,846 and 3,312,553 and British Patent Nos. 861,414 and 103,189) can be used singly or in combination. The acid processed gelatin is advantageously used in view of water resistance.

The gelatin content of the ink receiving layer in the invention is preferably 3 to 20 g/$m^2$, and more preferably 5 to 15 g/$m^2$.

The water soluble polymer other than gelatin herein referred to is a polymer having a repeated water soluble monomer unit in the chemical structure.

The water soluble polymer other than gelatin preferably used in the invention includes polyvinyl alcohol, polyvinyl pyrrolidone, polyvinyl pyridinium halide, modified polyvinyl alcohol such as polyvinyl formal or their derivatives (see Japanese Patent O.P.I. Publication Nos. 145879/1985, 220750/1985, 143177/1986, 235182/1986, 235183/1986, 237681/1986 and 261089/1986), an acryl group-containing polymer such as polyacrylamide, polydimethylacrylamide, polydimethylaminoacrylate, or acrylic acid-vinyl alcohol copolymer (disclosed in Japanese Patent O.P.I. Publication Nos. 168651/1985 and 9988/1987), a natural polymer or its derivatives such as starch, oxidation starch, carboxylated starch, dialdehyde starch, cationated starch, dextrin, sodium alginate, gum arabic, casein, pullulan, dextrane, methylcellulose, ethylcellulose, carboxymethylcellulose or hydroxypropylcellulose (Japanese Patent O.P.I. Publication Nos. 174382/1974, 262685/1985, 143177/1986, 181679/1986, 193879/1986 and 287782/1986), a polyalkylene glycol such as polyethylene glycol or polypropylene glycol, a synthetic polymer such as polyvinyl ether, polyglycerin, maleic acid-alkylvinylether copolymer, maleic acid-N-vinylpyrrole copolymer, styrene-maleic anhydride copolymer or polyethylene imine (disclosed in Japanese Patent O.P.I. Publication Nos.32787/1986, 237680/1986 and 277483/1986). Of these, the preferable are polyvinyl pyrrolidones, polyvinyl alcohols or polyalkylene oxides.

The polyalkylene oxides include polyethylene oxides, polyethylene glycols, polypropylene glycols and a compound represented by the following formula (P).

$$R_3O—(A_4O)_{j4}—(A_5O)_{j5}—(A_6O)_{j6}—R_4 \qquad \text{formula (P)}$$

wherein $A_4$, $A_5$ and $A_6$ independently represent a substituted or unsubstituted, straight-chained or branched alkylene group, provided that $A_1$, $A_2$ and $A_3$ are not simultaneously the same groups; and $R_3$ and $R_4$ independently represent a hydrogen atom, a substituted or unsubstituted alkyl group, a substituted or unsubstituted aryl group or an acyl group, provided that $R_3$ and $R_4$ may be the same or different.

The substituent includes a hydroxy group, a carboxyl group, a sulfonyl group, an alkoxy group, a carbamoyl group and a sulfamoyl group. It is preferable that $R_4$ and $R_5$ both are hydrogen atoms and $A_4$, $A_5$ and $A_6$ independently represent an unsubstituted alkylene group. It is more preferable that $A_4$, $A_5$ and $A_6$ independently represent $—CH_2CH_2—$ or $—CH(CH_3)—CH_2—$.

J4, j5 and j6 independently represent an integer of 0 to 500, provided that J4+j5+j6≧5.

The polyalkylene oxide is preferably polyethylene oxide. The polyethylene oxide (hereinafter referred to also as PEG) has an average molecular weight of preferably 10,000 to 500,000, and more preferably 50,000 to 300,000.

The average molecular weight herein referred to means the average molecular weight obtained from a hydroxyl value.

The coating amount of the water soluble polymer other than gelatin in the ink receiving layer is preferably 0.5 to 60 g/$m^2$, and more preferably 1 to 20 g/$m^2$.

The ink receiving layer in the invention preferably contains basic latex and/or at least one selected from cationic water soluble polymers in order to provide water resistance property.

The basic latex herein referred to is a latex of copolymer of a monomer unit having a cationic group or an electron pair providing group in its chemical structure with another monomer unit. Another monomer includes ethylenic monomers, for example, acrylic acids, vinylesters, olefins, styrenes, chrotones, itaconic acids, maleic acids, fumalic acids, acryl amides, allyl compounds, vinyl ethers, vinyl ketones, vinyl heterocycles, glycidyl esters, unsaturated nitrites, polyfunctional monomers, or various unsaturated acids. These monomers are used singly or in combination. The preferable latex is a basic latex represented by the following formula X:

$$—(A)n1—(B)n2—(C)n3— \qquad \text{formula X}$$

wherein A represents a monomer unit of being copolymerized having a substituted or unsubstituted amino group or a substituted or unsubstituted ammonium group; B represents a monomer unit having two ethylenically unsaturated group; C represents a monomer unit other than A or B; and n1 represents 10 to 99 mol %, n2 represents 0 to 10 mol %, and n3 represents 0 to 90 mol %.

The coating amount of the basic latex in the ink receiving layer is preferably 0.1 to 20 g/$m^2$, and more preferably 0.2 to 10 g/$m^2$.

In the invention, a cationic water soluble polymer is preferably used.

The cationic water soluble polymer preferably used in the invention includes a polymer capable of forming a polymer cation in an aqueous solution. The typical polymer thereof includes a polymer having a primary, secondary or tertiary amino group or a quaternary ammonium group disclosed in Japanese Patent O.P.I. Publication Nos. 61-61887, 61-63477, 5-104848 and 5-124329. Any cationic water soluble polymer can be used, and is not limited, but the cationic water soluble polymer as listed below is preferably used in the invention.

a) Polyallyl amines b) Dicyandiamide condensates c) Polyethylene imines d) Cation-modified PVA e) Cation-modified PVP f) Epichlorhydrin derivatives g) Amino group substituted nylon h) Polymer having a constitution unit derived from a monomer represented by the following formula 1 i) Polymer having a constitution unit derived from a monomer represented by the following formula 2 j) Polymer having a constitution unit derived from a monomer represented by the following formula 3 k) Polymer having a constitution unit derived from a monomer represented by the following formula 4 formula 1

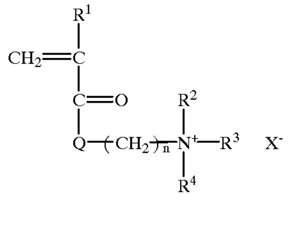

-continued formula 2

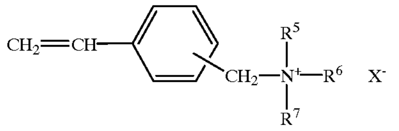

formula 3

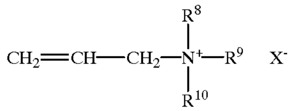

formula 4

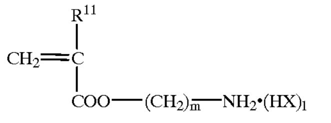

wherein $R^1$ and $R^{11}$ independently represents a hydrogen atom, or a substituted or unsubstituted lower alkyl group; Q represents oxygen or —NH—; $R^2$, $R^3$, and $R^4$ independently represent a substituted or unsubstituted lower alkyl group, and may be the same or different from each other; $X^-$ represents a halogen ion, a sulfonate anion, an alkylsulfonate anion, an acetate ion, or an alkylcarboxylate anion; and n represents an integer 2 or 3.

$R^5$, $R^6$ and $R^7$ independently represent a substituted or unsubstituted lower alkyl group, and may be the same or different from each other; $X^-$ represents a halogen ion, a sulfonate anion, an alkylsulfonate anion, an acetate ion, or an alkylcarboxylate anion; and n represents an integer 2 or 3.

$R^8$, $R^9$ and $R^{10}$ independently represent a substituted or unsubstituted lower alkyl group, and may be the same or different from each other; $X^-$ represents a halogen ion, a sulfonate anion, an alkylsulfonate anion, an acetate ion, or an alkylcarboxylate anion; and n represents an integer 2 or 3.

The lower alkyl group represented by $R^1$ through $R^{11}$ is preferably methyl or ethyl; X represents a halogen atom (for example, chlorine, bromine or iodine); and m is an integer of 1 or 2; and l represents 0 or 1.

In the invention, a cross-linking agent is preferably added to the image receiving layer to control the layer swelling amount of the ink receiving layer and the layer solubility time of the ink receiving layer. The example of the cross-linking agent includes organic cross-linking agents, for example, aldehyde compounds such as formaldehyde and glutaraldehyde, ketone compounds such as diacetyl and chloropentanedione, bis(2-chloroethylurea), a triazine compound such as 2-hydroxy-4,6-dichloro-1,3,5-triazine, reactive halogen-containing compounds disclosed U.S. Pat. No. 3,288,775, divinylsulfone, a carbamoylpyridinium compound disclosed in Japanese Patent O.P.I. Publication No. 8-50342, reactive olefin-containing compounds disclosed U.S. Pat. No. 3,635,718, N-methylol compounds disclosed U.S. Pat. No. 2,732,316, isocyanates disclosed U.S. Pat. No. 3,103,437, aziridine compounds disclosed U.S. Pat. Nos. 3,017,280 and 2,983,611, carbodiimides disclosed U.S. Pat. No. 3,100,704, epoxy compounds disclosed U.S. Pat. No. 3,091,537, a halogencarboxyaldehyde such as mucochloric acid, a dioxane derivative such as dihydroxy dioxane, and inorganic cross-linking agents, for example, chromium alum, potash alum, zirconium sulfate and boric acid. These cross-linking agents can be used singly or in combination. The addition amount of cross-linking agents is preferably 0.01 to 10 g, and more preferably 0.1 to 5 g based on 100 g of ink receiving layer.

Of these cross-linking agents, at least one selected from triazine compounds and carbamoyl pyridinium compounds is preferably used, and more preferably a compound represented by formula I previously described. The use of the compound represented by formula I provides the effects of the invention, and improves image glossiness, resulting in high image quality.

The compound represented by formula I will be explained below.

In formula I, $R_{16}$ and $R_{17}$ independently represent an alkyl group or an aryl group, provided that $R_{16}$ and $R_{17}$ may combine with each other to form a ring; $R_{18}$ represents a hydrogen atom or a monovalent substituent; $L_1$ represents a single bond or a divalent linkage group: and $L_2$ represents a single bond, an oxygen atom, or —$N(R_{19})$— in which $R_{19}$ represents a hydrogen atom, an alkyl group or an aryl group.

The alkyl group represented by $R_{16}$ or $R_{17}$ in formula I includes a straight-chained, branched, or cyclic alkyl group having 1 to 20 carbon atoms (for example, methyl, ethyl, butyl, cyclohexyl, 2-ethylhexyl or dodecyl), and the aryl group represented by $R_{16}$ or $R_{17}$ in formula I includes an aryl group having 6 to 30 carbon atoms (for example, phenyl or naphthyl).

$R_{16}$ or $R_{17}$ may have a substituent, and the substituent includes a straight-chained or cyclic alkyl group having 1 to 8 carbon atoms (for example, methyl, ethyl, i-propyl, butyl, hexyl, cyclopropyl, cyclopentyl, cyclohexyl, 2-hydroxyethyl, 4-carboxybutyl, 2-methoxyethyl, benzyl, phenetyl, 4-carboxybenzyl, or 2-dimethylaminoethyl), an alkenyl group having 2 to 8 carbon atoms (for example, vinyl or acryl), an alkoxy group having 1 to 8 carbon atoms (for example, methoxy, ethoxy, propoxy, or butoxy), a halogen atom (for example, fluorine, chlorine or bromine), an amino group having 0 to 10 carbon atoms (for example, amino, dimethylamino, or carboxyethylamino), an ester group having 2 to 10 carbon atoms (for example, methoxycarbonyl or ethoxycarbonyl), an amido group having 1 to 10 carbon atoms (for example, acetylamino, or benzamido), a carbamoyl group having 1 to 10 carbon atoms (for example, carbamoyl, methylcarbamoyl, or ethylcarbamoyl), an aryl group having 6 to 10 carbon atoms (for example, phenyl, naphthyl, 4-carboxyphenyl, 3-carboxyphenyl, 3,5-dicarboxyphenyl, 4-methanesulfonamidophenyl, or 4-butanesulfonamidophenyl), an aryloxy group having 6 to 10 carbon atoms (for example, phenoxy, 4-carboxyphenoxy, 4-methyphenoxy, or naphthoxy), an alkylthio group having 1 to 8 carbon atoms (for example, methylthio, ethylthio or octylthio), an arylthio group having 6 to 10 carbon atoms (for example, phenylthio or naphthylthio), an acyl group having 1 to 10 carbon atoms (for example, acetyl, propanoyl, benzoyl, or pivaloyl), a sulfonyl group having 1 to 10 carbon atoms (for example, methanesulfonyl or benzenesulfonyl), a ureido group having 1 to 10 carbon atoms (for example, ureido or methylureido), a urethane group having 2 to 10 carbon atoms (for example, methoxycarbonylamino or ethoxycarbonylamino), a cyano group, a hydroxy group, a nitro group, and a heterocyclic residue (for example, 5-carboxybenzoxazolyl, pyridyl, sulfolanyl, furyl, pyrrolyl, pyrroridinyl, morphorinyl, piperazinyl, or pyrimidinyl). The preferable substituent is a hydrogen atom, an alkyl group, an alkoxy group, an ester group, a halogen atom, a cyano group, or a hydroxy group.

$R_{16}$ and $R_{17}$ preferably combine with each other to form a nitrogen-containing ring, and the especially preferable ring is a morpholine or pyrrolidine ring. $R_{18}$ represents a hydrogen atom or a substituent, and the substituent includes those as denoted in the substituent of $R_{16}$ and $R_{17}$ as described above.

$L_1$ represents a single bond, an alkylene group with 1 to 20 carbon atoms (for example, methylene, ethylene, or propylene), an arylene group with 6 to 20 carbon atoms (for example, phenylene) or a combination thereof (for example, p-xylylene), alkylenecarbonylamino (for example, $—NHCOCH_2—$), or alkylenesulfoxylamino (for example, $—NHSO_2CH_2—$). Of these, the preferable is a single bond, alkylene such as methylene or ethylene, or acylamino.

$L_2$ represents a single bond, —O— or $—N(R_{19})—$ in which $R_{19}$ represents a hydrogen atom, an alkyl group with 1 to 20 carbon atoms (for example, methyl, ethyl or benzyl), or an aryl group with 6 to 20 carbon atoms (for example, phenyl) or an alkoxy group with 1 to 20 carbon atoms (for example, methoxy), and preferably a hydrogen atom.

The examples of a cross-linking agent represented by formula I, which are preferably used in the invention, are listed below.

Exemplified compounds (1)

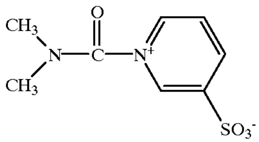

(2)

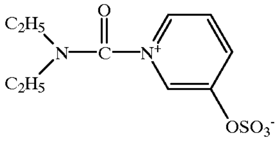

(3)

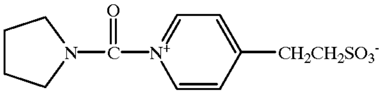

(4)

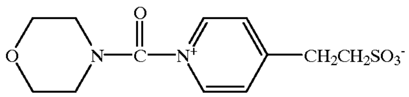

(5)

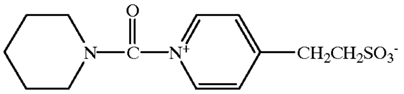

(6)

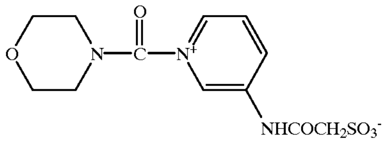

(7)

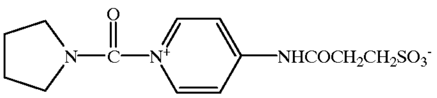

-continued (8)

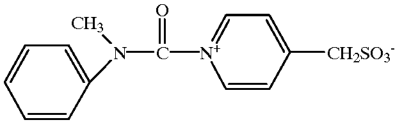

(9)

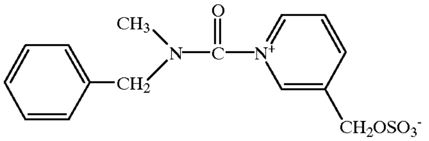

(10)

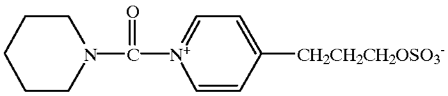

(11)

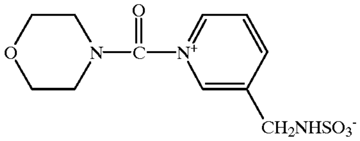

(12)

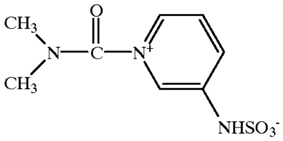

(13)

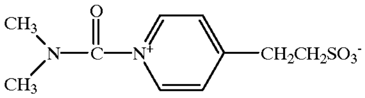

(14)

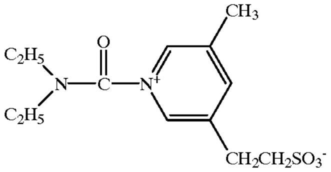

(15)

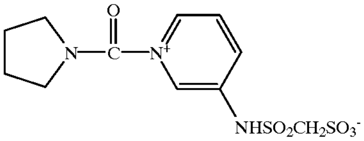

(16)

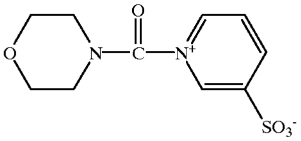

(17)

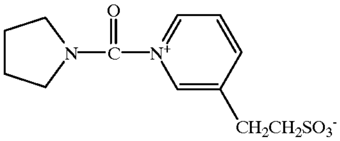

As a coating method of the ink receiving layer in the invention, any conventional coating method such as a sizepress method, a roll coating method, a blade coating method, an air-knife method, a gate roll coating method, a curtain method, a slide hopper method and an extrusion method can be used.

The ink receiving layer in the invention may further contain, in addition to the binder and cross-linking agent, various conventional additives such as inorganic pigment, colorants, colored pigment, a fixing agent for ink dyes, a UV absorber, an anti-oxidant, a dispersing agent, an anti-foaming agent, a leveling agent, an antiseptic agent, a brightening agent, a viscosity stabilizing agent and a pH adjusting agent.

The ink receiving layer in the invention preferably contains a surfactant in order to improve image quality, as long as it jeopardizes ink absorption property. The surfactant includes an anionic, cationic, nonionic or betaine type surfactant, which may below or high molecular weight. The different kinds of surfactants may be used in combination.

The above mentioned fluorine-containing surfactants can be synthesized by methods described in U.S. Pat. Nos. 2,559,751, 2,567,011, 2,732,398, 2,764,602, 2,806,866, 2,809,998, 2,915,376, 2,915,528, 2,918,501, 2,934,450, 2,937,098, 2,957,031, 3,472,894 and 3,555,089, British Patent Nos. 1,143,927 and 1,130,822, Japanese Patent Publication No. 37304/1970, Japanese Patent O.P.I. Nos. 9613/1972, 134614/1974, 117705/1975, 117727/1975, 121243/1975, 41182/1977 and 12392/1976, J. Chem, Soc., 1950, page 2789 and 1957, pp. 2574 and 2640, J. Amer. Chem. Soc., Volume 79, page 2549 (1957), J. Japan Oil Chemists Soc., Volume 12, page 653 and J. Org. Chem., Volume 30, page 3524 (1965).

Some of the above-mentioned fluorine-containing surfactants are commercially available as follows: Megafac F produced by DaiNippon Ink Chemical Industry Co, Ltd.; Fluorad FC produced by Minesota Mining and Manufacturing Company; Monflor produced by Imperial Chemical Industry; Zonyls produced by E. I. Du Pont Numerous and Company; Licowet produced by Falbewerke Hechst.

The coating amount of the surfactant in the ink receiving layer is preferably 0.001 to 1 g/$m^2$, and more preferably 0.002 to 0.5 g/$m^2$.

The coating amount of the ink receiving layer is preferably 8 to 100 g/$m^2$ in view of controllability of the layer swelling amount or anti-curl property, and more preferably 10 to 50 g/$m^2$.

The ink receiving layer is provided on one side of a support, but can be provided on both sides of the support to prevent curling.

The ink receiving layer in the invention may contain a matting agent in order to minimize adhesion failure.

The matting agent can be defined as discontinuously dispersed particles such as inorganic or organic materials capable of being dispersed in a hydrophilic organic colloid. The inorganic matting agent includes oxides such as silicon oxide, titanium oxide, magnesium oxide and aluminum oxide, alkali earth metal salts such as barium sulfate, calcium carbonate, and magnesium sulfate, light-insensitive silver halide particles such as silver chloride and silver bromide (each of which may contain a small amount of an iodine atom), and glass.

The organic matting agent includes starch, cellulose ester such as cellulose acetate propionate, cellulose ether such as ethyl cellulose and a synthetic resin. The synthetic resin is a water insoluble or sparingly soluble polymer which includes a polymer of an alkyl(meth)acrylate, an alkoxyalkyl(meth) acrylate, a glycidyl(meth)acrylate, a (meth)acrylamide, a vinyl ester such as vinyl acetate, acrylonitrile, an olefin such as ethylene, or styrene and a copolymer of the above described monomer with other monomers such as acrylic acid, methacrylic acid, α,β-unsaturated dicarboxylic acid, hydroxyalkyl(meth)acrylate, sulfoalkyl(meth)acrylate and styrene sulfonic acid.

Further, an epoxy resin, nylon, polycarbonates, phenol resins, polyvinyl carbazol or polyvinylidene chloride can be used.

It is preferable in view of transportability that the weight average size of the matting agent is 3 to 20 μm, and the matting agent content of the image receiving layer is 10 to 100 mg/$m^2$. In view of coatability, the matting agent with a size of less than 3 μm and the matting agent with a size exceeding 20 μm are preferably removed before coating by classification. The matting agents can be used in combination.

As a support used in the invention, a transparent or translucent support can be optionally used according to its use.

A conventional support can be used as the transparent support, which includes a film of polyester resins, cellulose acetate resins, acryl resins, polycarbonate resins, polyvinyl chloride resins, polyimide resins, cellophane or celluloid. Of these, a polyester resin film is preferable and a polyethylene terephthalate film is especially preferable in view of stiffness and transparency.

The translucent support used includes non-coated paper such as wood free paper, paper subjected to super calendering, glazing paper, tracing paper, coated paper such as art paper, coat paper, light coat paper, slightly coated paper or cast coat paper, various films such as a plastic film, a pigment-containing translucent film and a foaming film, resin-covered paper, resin-containing paper, unwoven paper, and a cloth and their combination. Among these, the resin-covered paper or various films are preferable in view of glossiness or smoothness, and a polyolefin covered paper or a polyester film is preferable in view of touchiness or luxuriousness.

The base paper constituting the resin-covered paper used in the invention is not specifically limited, and any conventional paper can be used, but a smooth paper used as a conventional photographic support is preferable. As pulp constituting the base paper, natural pulp, reproduct ion pulp or synthetic pulp is used singly or in admixture. These base papers may contain additives such as a sizing agent, a reinforcing agent, a filler, an anti-static agent, a fluorescent brightening agent or a dye which is usually used in paper manufacture. A surface sizing agent, a surface reinforcing agent, a fluorescent brightening agent, an antistatic agent and an anchoring agent may be coated on the surface.

The thickness of the base paper is not specifically limited, but a base paper having a smooth surface is preferable, which is obtained by applying pressure to or calendering, paper, during or after papering.

As the resin for the resin-covered paper, a polyolefin resin or a resin capable of being hardened with an electron beam can be used. The polyolefin resin includes an olefin homopolymer such as a low density polyethylene, a high density polyethylene, polypropylene or polypentene, an olefin copolymer such as ethylene-propylene copolymer or their mixture, each having various densities or melt viscosity indexes (melt index). These resins can be used singly or in combination.

The resin for the resin-covered paper preferably contains various additives, for example, white pigment such as titanium oxide, zinc oxide, talc or calcium carbonate, a fatty acid amide such as stearic acid amide or arachidic acid amide, a fatty acid metal salt such as zinc stearate, calcium stearate, aluminum stearate or magnesium stearate, an antioxidant such as Irganox 1010 or Irganox 1076, blue pigment or dyes such as cobalt blue, ultramarine, or phthalocyanine blue, magenta pigment or dyes such as cobalt violet, fast violet or manganese violet, a brightening agent and a UV absorber. These additives can be suitably used in combination.

The support in the invention is preferably a support having a Taber stiffness according to JIS P-8125 of 1 to 15 g.cm, since it provides improved transportability, reduces streak occurrence due to transporting failure, and results in high quality images.

The ink jet recording method of the invention is an ink jet recording method comprising the step of jetting ink on the recording sheet of item 1, 2, 3, 4, 5, or 6 described earlier, wherein the ink contains 40 weight % or more of water. The ink is a recording liquid comprising the following colorants, solvents and other additives. The colorant includes water soluble dyes such as direct dyes, acid dyes, basic dyes, reactive dyes and food dyes.

The solvent for ink in the invention includes alkyl alcohols having 1 to 4 carbon atoms such as methyl alcohol, ethyl alcohol, isopropyl alcohol, butyl alcohol, sec-butyl alcohol, tert-butyl alcohol and iso-butyl alcohol, amides such as dimethylformamide and dimethylacetoamide, ketones or ketonealcohols such as acetone and diacetone alcohol, ethers such as tetrahydrofurane and dioxane, polyalkylene glycols such as polyethylene glycol and polypropylene glycol, alkylene glycols having 2 to 6 carbon atoms such as ethylene glycol, propylene, butylene glycol, triethylene glycol, 1,3,6-hexane triol, hexylene glycol, thiodiglycol and diethylene glycol, polyhydric alcohol lower alkyl ethers such as glycerin, ethylene glycol methylether, diethylene glycol methyl(or ethyl)ether and triethylene glycol monomethylether, pyrrolidinones such as 2H-pyrrolidinone, and pyrrolidones such as 1-methyl-2-pyrrolidone and 2-pyrrolidone. Of these water soluble solvents, a polyhydric alcohol such as diethylene polyhydric alcohol lower alkyl ethers such as triethylene glycol monomethylether and triethylene glycol monoethylether, and pyrrolidones are preferable.

In the invention, the solvent for ink is preferably a mixture solvent of water and the above described organic solvent in view of prevention of ink head nozzle clogging. The water content of the ink is not more than 40 weight %, and preferably 50 to 90 weight %.

Another ink additive includes a pH adjusting agent, a metal chelating agent, an anti-fungal, a viscosity adjusting agent, a surface tension adjusting agent, a wetting agent, a surfactant and an anti-rust agent.

In the invention, the maximum amount of ink, which is jetted on a recording sheet for ink jet recording from an ink jet head, is preferably 40 to 60 g/m$^2$ in view of maximum image density and resolving power, and preferably 40 to 50 g/m$^2$ in view of ink drying property.

The invention will be detailed in the following examples, but the invention is not limited thereto. In the examples, all parts are by weight, unless otherwise specified.

EXAMPLE 1

A support, in which a resin composition consisting of 70 parts of low density polyethylene and 20 parts of high density polyethylene was coated on one side of paper base having a basis weight of 110 g to be 25 g/m$^2$, and a resin composition consisting of 50 parts of low density polyethylene and 50 parts of high density polyethylene was coated on the other side of the paper base to be 25 g/m$^2$, was employed.

The coating solution (a solid content of 8 weight %) having the following composition was coated on the support by a bar coater, dried to give a coating weight of the coated as shown in Table 1, and stored at 50° C. and 40% RH for 12 hours. Thus, ink jet recording sheet sample 1 was obtained.

| <Ink receiving layer coating composition> | |
|---|---|
| Gelatin (KV-3000 produced by Konica Gelatin Corporation) | 49.5 parts |
| PVP-K-90 (produced by BASF Co., Ltd.) | 49.5 parts |
| Cross-linking agent (as shown in Table 1) | 1 part |

EXAMPLES 2 THROUGH 13

Ink jet recording sheet samples 2 through 13 were prepared in the same manner as in Example 1, except that the coating weight of each component of the coated ink receiving layer was as shown in Table 1.

The resulting samples 1 through 13 were evaluated according to the methods below. The evaluation methods were as follows:

Layer Swelling Amount

Each sample was allowed to stand at 23° C. and 55% RH, and then, the thickness of the ink receiving layer before swelling was measured. Next, the sample was immersed in 20° C. distilled water for 3 minutes to swell the ink receiving layer, dan the thickness of the ink receiving layer, after swelling, was measured. Thereafter, the layer swelling amount was obtained by subtracting the thickness of the ink receiving layer before swelling from the thickness of the ink receiving layer after swelling.

Layer Dissolving Time

The layer dissolving time was measured as the time from when 20° C. distilled water was dropped on the ink receiving layer of each sample at 23° C. and 55 % RH to swell the layer, to when the swelled layer was dissolved in the water to be the initial dry thickness of the ink receiving layer, while touching the swelled layer continually with a needle with a 0.2 g load applied, the tip end surface of the needle having a 3 mm diameter plane, whereby the thickness of the layer was measured.

Water Resistance

Each sample was immersed in 20° C. distilled water for 3 minutes, and then, the water of the ink receiving layer was wiped off with a cloth. The resulting ink receiving layer was visually observed and evaluated for water resistance according to the following criteria:

A: No separation of the ink receiving layer observed, and no problems

B: Little separation of the ink receiving layer observed, and no practical problems C: partial separation of the ink receiving layer observed, and acceptable limits of practicality D: Entire separation of the ink receiving layer observed, and not acceptable in practical Using an ink jet printer BJC-420J (produced by Canon Co., Ltd.) and an exclusive ink, an image was recorded on the samples obtained in Examples 1 through 10 above, and evaluated according to the methods described later. The maximum ink jetting amount was 42 g/m$^2$. The ink composition was as follows:

| | | weight parts |
|---|---|---|
| Y: | C.I. Direct Yellow | 2 |
| | Glycerin | 8 |
| | Diethylene glycol | 6 |
| | Water | 84 |
| M: | C.I. Acired 52 | 1.5 |
| | Glycerin | 8 |
| | Diethylene glycol | 6 |
| | Water | 84.5 |
| C: | C.I. Direct Blue | 1.5 |
| | Glycerin | 8 |
| | Diethylene glycol | 6 |
| | Water | 84.5 |
| K: | C.I. Foodblack 2 | 1.5 |
| | Glycerin | 8 |
| | 2-Pyrrolidinone | 4 |
| | Water | 86.5 |

Ink Absorption and Drying Property

Three minutes, 10 minutes and one hour after blue (B), green (G), red (R) and black (K) images were printed at their maximum densities on the samples, commercially available wood free paper was brought into contact with the B, G, R and K images, and then, the transfer degree of the ink image onto the wood free paper was evaluated according to the following criteria:

A: The contact carried out 3 minutes after printing resulted in slight ink transfer of K images, but the contact carried out 10 minutes and one hour after printing resulted in no ink transfer observed and therefore, there is no practical problem.

B: The contact carried out 3 minutes after printing resulted in slight ink transfer of the B, G, R and K images, but the contact carried out 10 minutes and one hour after printing resulted in no ink transfer and therefore, there is no practical problem.

C: The contact carried out 10 minutes after printing resulted in ink transfer at some of the B, G, R and K images, being within practical acceptable limits, and the contact carried out one hour after printing resulted in no ink transfer.

D: The contact carried out one hour after printing resulted in ink transfer at some of the B, G, R and K images, and presented some practical problems.

Density Unevenness

The yellow (Y), magenta (M), cyan (C), blue (B), green (G), and red (R) images were visually observed and evaluated for density unevenness.

A: No mottled density unevenness observed, and excellent images

B: Slightly mottled density unevenness observed, but no practical problems

C: Mottled density unevenness observed, but acceptable limits of practicality

D: Marked mottled density unevenness observed, and not practically acceptable

Light Fastness

After uniform yellow (Y), magenta (M), cyan (C), and black (K) images were printed on the sample at maximum density, the resulting images were exposed for one week to an Xenon Fade-O-Meter (70,000 lux), and the density of each color image after and before the exposure was measured, from which the remaining density rate was calculated.

A: The remaining density of each color image was not less than 90%, and presented excellent images.

B: The remaining density of one of the yellow (Y), magenta (M), cyan (C), and black (K) images was 70 to 90%, and the remaining density of the rest was not less than 90%.

C: The remaining density of each color image was not less than 70%, but within practical acceptable limits.

D: The remaining density of one of the yellow (Y), magenta (M), cyan (C), and black (K) images was less than 70%, and not practically acceptable.

Image Blurring Under High Humidity

Text characters of yellow (Y), magenta (M), cyan (C) and black (K) images were printed at their maximum densities on the samples. The resulting samples were stored at 25° C. and 85% RH for one week, and character blurring was visually observed and evaluated for image blurring under high humidity according to the following evaluation criteria:

A: No image blurring observed, and excellent images

B: Slight image blurring observed, but no practical problems

C: Some image blurring observed, but the printed text characters were legible, and within practical acceptable limits.

D: Image blurring observed, and the printed text characters were illegible and not practically acceptable.

The results of Examples 1 to 13 are shown in Table 1.

TABLE 1

| Sample No. (Sample No.) | | 1 | 2 | 3 | 4 | 5 | 6 | 7 |
|---|---|---|---|---|---|---|---|---|
| Coating amount ($g/m^2$) | Gelatin | 6 | 6 | 6 | 6 | 6 | 12 | — |
| | PVP | 6 | 6 | — | — | 6 | — | 2 |
| | PVA | — | — | 6 | — | — | — | — |
| | Modified PVA | — | — | — | 6 | — | — | 13 |
| | Cross-linking agent 1 | 0.1 | — | 0.1 | 0.1 | 0.1 | 0.1 | 0.2 |
| | Cross-linking agent 2 | — | 0.1 | — | — | — | — | — |
| | Fluorine-containing surfactant | — | — | — | — | 0.01 | — | — |
| | Total coating amount | 12.1 | 12.1 | 12.1 | 12.1 | 12.11 | 12.1 | 15.2 |
| Layer swelling amount ($cc/m^2$) | | 52 | 78 | 35 | 40 | 50 | 118 | 32 |
| Layer dissolving time (minute) | | not less than 60 | not less than 60 | not less than 60 | not less than 60 | not less than 60 | not less than 60 | 15 |
| Ink absorption and drying property | | A | A | A | A | A | B | B |
| Density unevenness | | B | B | C | B | A | C | C |
| Water resistance | | B | B | B | B | B | A | C |
| Light fastness | | B | B | A | B | B | B | A |

TABLE 1-continued

| | | | | | | | |
|---|---|---|---|---|---|---|---|
| Image blurring under high humidity | B | B | B | B | B | B | B |
| Remarks | Inv. | Inv. | Inv. | Inv. | Inv. | Inv. | Inv. |

| Sample No. (Sample No.) | | 8 | 9 | 10 | 11 | 12 | 13 |
|---|---|---|---|---|---|---|---|
| Coating amount ($g/m^2$) | Gelatin | 2 | 3 | 4 | 3 | 6 | 6 |
| | PVP | 2 | 4 | 4 | 3 | 6 | 6 |
| | PVA | — | — | — | — | — | — |
| | Modified PVA | 4 | 1 | — | — | — | — |
| | Cross-linking agent 1 | 0.05 | 0.05 | 0.1 | 0.05 | 0.5 | — |
| | Cross-linking agent 2 | — | — | — | — | — | 0.01 |
| | Fluorine-containing surfactant | — | — | — | — | — | — |
| | Total coating amount | 8.05 | 8.05 | 8.2 | 6.05 | 12.5 | 12.01 |
| Layer swelling amount ($cc/m^2$) | | 25 | 34 | 23 | 15 | 15 | 150 |
| Layer dissolving time (minute) | | 17 | 24 | not less than 60 | not less than 60 | not less than 60 | 2 |
| Ink absorption and drying property | | C | B | C | D | D | C |
| Density unevenness | | B | A | B | B | D | B |
| Water resistance | | C | C | B | B | B | D |
| Light fastness | | B | B | B | C | D | B |
| Image blurring under high humidity | | B | B | B | D | C | B |
| Remarks | | Inv. | Inv. | Inv. | Comp. | Comp. | Comp. |

Comp.: Comparative
Gelatin: KV3000 produced by Konica Gelatin Co., Ltd.
PVP: PVP-K90 produced by BASF Co., Ltd.
PVA: Gosenol CL-05 produced by Nihon Gosei Kagaku Co., Ltd.
Modified PVA: Gosenol OKS-9162 produced by Nihon Gosei Kagaku Co., Ltd.
Cross-linking agent 1: a compound shown later
Cross-linking agent 2: a compound shown later
Fluorine-containing surfactant: surfactant FK shown later Cross-linking agent 1

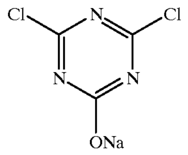

Cross-linking agent 2

$$[(CH_2{=}CH{-}SO_2CH_2)_3{-}C{-}CH_2SO_2CH_2CH_2]_2{-}N(CH_2)_2SO_3^-K^+$$

Surfactant FK $$C_8F_{17}SO_2NH(CH_2)_3\overset{+}{N}(CH_3)_3\cdot I^-$$

As is apparent from Table 1, inventive ink-jet recording sheet samples comprising an ink receiving layer having the layer swelling amount and the layer dissolving time in the invention, which are obtained by controlling the kinds or coating amount of the binder or the kinds or coating amount of the cross-linking agent, provide excellent ink absorption and drying property, excellent water resistance, and images with no density unevenness, with no image blurring under high humidity and with improved light fastness. Further, the inventive ink-jet recording sheet samples, in which the image receiving layer contains gelatin and another water soluble polymer, provide more excellent ink absorption and drying property. Furthermore, the inventive ink-jet recording sheet samples, in which the image receiving layer contain a fluorine containing surfactant, provide a high quality with more reduced density unevenness.

EXAMPLES 14 THROUGH 20

The following supports were prepared.

a) A resin-covered paper support, in which a resin composition consisting of 70 parts of low density polyethylene and 20 parts of high density polyethylene was coated on one side of a paper base having a basis weight of 140 g to be 30 $g/m^2$, and a resin composition consisting of 50 parts of low density polyethylene and 50 parts of high density polyethylene was coated on the other side of the paper base to be 30 $g/m^2$ b) A resin-covered paper support, in which a resin composition consisting of 70 parts of low density polyethylene and 20 parts of high density polyethylene was coated on one side of a paper base having a basis weight of 80 g to be 15 $g/m^2$, and a resin composition consisting of 50 parts of low density polyethylene and 50 parts of high density polyethylene was coated on the other side of the paper base to be 15 $g/m^2$ c) A 95 $\mu$m thick polyethylene terephthalate film support containing titanium oxide d) A 115 $\mu$m thick transparent polyethylene terephthalate film support e) A 160 $\mu$m thick cast coat paper f) A resin-covered paper support, in which a resin composition consisting of 70 parts of low density polyethylene and 20 parts of high density polyethylene was coated on one side of a paper base having a basis weight of 55 g to be 12 $g/m^2$, and a resin composition consisting of 50 parts of low density polyethylene and 50 parts of high density polyethylene was coated on the other side of the paper base to be 112 $g/m^2$ g) A 220 μm thick polyethylene terephthalate film support containing titanium oxide The coating solutions having the following compositions were coated on the supports a) through g) by a slide hopper method in the same manner as in Example 1, except that the coating weight of the coated was 14 $g/m^2$. Thus, ink jet recording sheet samples 14 through 20 were obtained. The layer closer to the support was designated as a first layer, which had a dry thickness of 10 $g/m_2$ and the layer farther than the support was designated as a second layer, which had a dry thickness of 4 $g/m^2$.

| <Second layer coating composition for ink receiving layer> | |
|---|---|
| Gelatin (KV-3000 produced by Konica Gelatin Co., Ltd.) | 50 parts |
| PVP-K-90 (produced by BASF Co., Ltd.) | 47 parts |
| Organic fine particle matting agent MR-13G (produced by Soken Kagaku Co. Ltd.) | 0.8 parts |
| Surfactant FA described later | 0.1 parts |
| Surfactant FK described later | 0.1 parts |
| Cross linking agent 1 | 2 parts |
| **<First layer coating composition for ink receiving layer>** | |
| Gelatin (KV-3000 produced by Konica Gelatin Co., Ltd.) | 50 parts |
| PEG 150000 (Arcox R150 produced by Meisei Kagaku Co., Ltd.) | 25 parts |
| Nonion-modified polyvinyl alcohol OKS-9162 (produced by Nihon Gosei Kagaku Co., Ltd.) | 25 parts |

Using an ink jet printer and an exclusive ink, an image was recorded on the samples obtained above, and evaluated in the same manner as in Example 1. Further, unevenness of streak was evaluated according to the following method.

Unevenness of Streak

The black image after printing was visually observed, and evaluated for unevenness of streak.

A: Uniform images with no streak unevenness observed

B: Images with slight streak unevenness observed, but no practical problems

C: Images with streaks observed at regular intervals

D: Streaks observed over the entire image

The results of Examples 14 to 20 are shown in Table 2.

Surfactant FA

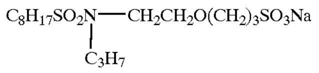

As is apparent from Table 2, inventive ink-jet recording sheet samples, which control Taber stiffness, provide a high quality with reduced streak unevenness.

EXAMPLES 21 THROUGH 27

The coating solution having the following composition was coated on the support of Example 1 in the same manner as in Example 1, except that the coating weight of the coated was as shown in Table 3. Thus, ink jet recording sheet samples 21 through 27 were obtained.

| <Ink receiving layer coating composition> | Coating amount |
|---|---|
| Gelatin (PM-46D produced by Miyagi Kagaku Kogyo Co., Ltd.) | as shown in Table 3 |
| PVP-K-90 (produced by BASF Co., Ltd.) | as shown in Table 3 |
| Polymer added (shown in Table 3) | as shown in Table 3 |
| Cross-linking agent 1 | as shown in Table 3 |

Using an ink jet printer and an exclusive ink, an image was recorded on the samples obtained above, and evaluated in the same manner as in Example 1. Further, the following evaluation was carried out.

Water Resistance at Image Portions

Uniform images of yellow (Y), magenta (M), cyan (C) and black (B) were printed with maximum density on each sample obtained above, and dried for one day. Twenty degrees Celsius distilled water was dropped on the image portion of the resulting samples, and allowed to stand for 30 seconds. Thereafter, the dropped water on the image portion was wiped off with a cloth, and the wiped portion was visually observed and evaluated for image water resistance according to the following criteria:

Image Water Resistance

A: No water drop trace observed, and excellent images

B: Slight water drop trace observed, but no practical problems

TABLE 2

| Sample No. (Sample No.) | 14 | 15 | 16 | 17 | 18 | 19 | 20 |
|---|---|---|---|---|---|---|---|
| Support | a) | b) | c) | d) | e) | f) | g) |
| Taber stiffness (cm · g) | 11.2 | 1.1 | 2.6 | 3.8 | 7.2 | 0.7 | 23 |
| Layer swelling amount ($cc/m^2$) | 65 | 65 | 65 | 65 | 65 | 65 | 65 |
| Layer dissolving time (minute) | not less than 60 | not less than 60 | not less than 60 | not less than 60 | not less than 60 | not less than 60 | not less than 60 |
| Ink absorption and drying property | A | A | A | A | A | A | A |
| Density unevenness | A | A | A | A | A | B | B |
| Water resistance | B | B | B | B | B | B | B |
| Light fastness | B | B | B | B | B | B | B |
| Image blurring under high humidity | B | B | B | B | B | B | B |
| Streak unevenness | B | B | B | B | B | C | C |
| Remarks | Inv. | Inv. | Inv. | Inv. | Inv. | Inv. | Inv. |

C: Water drop trace observed, but no layer separation observed

D: Layer separation observed, when the dropped water on the image portions was wiped off with a cloth.

The results of Examples 21 to 27 are shown in Table 3.

TABLE 3

| Example (Sample No.) | | 21 | 22 | 23 | 24 | 25 | 26 | 27 |
|---|---|---|---|---|---|---|---|---|
| Coating | Gelatin | 7 | 7 | 7 | 7 | 7 | 7 | 2 |
| amount | PVP | 7 | 7 | 7 | 7 | 7 | 7 | 2 |
| ($g/m^2$) | Cross-linking agent 1 | 0.1 | 0.1 | 0.1 | 0.1 | 0.1 | — | 0.1 |
| | Polymer 1 | — | 2 | — | — | 1 | 2 | 2 |
| | Polymer 2 | — | — | 2 | — | — | — | — |
| | Polymer 3 | — | — | — | 2 | 1 | — | — |
| | Total coating amount | 14.1 | 16.1 | 16.1 | 16.1 | 16.1 | 16 | 6.1 |
| Layer swelling amount ($cc/m^2$) | | 84 | 69 | 60 | 64 | 66 | 211 | 10 |
| Layer dissolving time (minute) | | not less than 60 | not less than 60 | not less than 60 | not less than 60 | not less than 60 | 3 | not less than 60 |
| Ink absorption and drying property | | A | A | A | A | A | A | D |
| Density unevenness | | B | B | C | B | B | A | C |
| Water resistance | | B | A | B | B | B | D | A |
| Light fastness | | B | A | A | B | B | B | C |
| Image blurring under high humidity | | B | A | A | A | A | B | B |
| Image water resistance | | C | B | B | B | B | D | B |
| Remarks | | Inv. | Inv. | Inv. | Inv. | Inv. | Comp. | Comp. |

Inv.: Invention, Comp.: Comparative
Gelatin: PM46D produced by Miyagi Kagaku Kogyo Co., Ltd.
Cross-linking agent 1: a compound shown above
Polymer 1: Polyethylene imine grafted methacrylic acid-butylacrylate-methylmethacrylate-styrene copolymer hydrochloride, Polyment NK-100PM produced by Nihon Shokubai Co., Ltd.
Polymer 2: polydimethyldiallylammonium chloride, PAS-H produced by Nittobo Co., Ltd.
Polymer 3: a polymer represented by the following formula:

Polymer 3

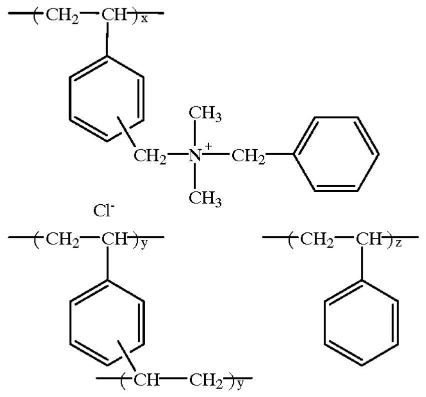

x:y:z = 49:2:49

As is apparent from Table 3, the inventive ink-jet recording sheet samples, which comprises the image receiving layer having the layer swelling amount and the layer dissolving time in the invention, and further containing a basic latex and/or a cationic water soluble polymer, provide more excellent results of the invention and improved image water resistance.

EXAMPLES 28 THROUGH 32

A support, in which a resin composition consisting of 70 parts of low density polyethylene and 20 parts of high density polyethylene was coated on one side of paper base having a basis weight of 140 g to be 30 $g/m^2$, and a resin composition consisting of 50 parts of low density polyethylene and 50 parts of high density polyethylene was coated on the other side of the paper base to be 30 $g/m^2$, was employed. The four coating solutions having the following compositions were coated on the support by a slide hopper method in the same manner as in Example 1, except that the coating weight of the coated ink receiving layer was 12 $g/m^2$. Thus, ink jet recording sheet samples 28 through 32 were obtained.

In the above samples, first, second, third and fourth coating solutions having the following compositions were coated on the support in that order to form a first layer having a coating weight of 1 $g/m^2$, a second layer having a coating weight of 5 $g/m^2$, a third layer having a coating weight of 5 $g/m^2$, and a fourth layer having a coating weight of 1 $g/m^2$.

| <Fourth layer coating composition for ink receiving layer> | |
|---|---|
| Gelatin (isoelectric point 8.0 produced by Stoes Corporation) | 44 parts |
| PVP-K90 (produced by BASF Co., Ltd.) | 8 parts |
| Nonion-modified polyvinyl alcohol OKS-9162 (produced by Nihon Gosei Kagaku Co., Ltd.) | 30 parts |
| Cationic polymer NK-100PM (produced by Nihon Shokubai Co., Ltd.) | 15 parts |
| Organic fine particle matting agent MR-13G (produced by Soken Kagaku Co., Ltd.) | 0.8 parts |

-continued

| | |
|---|---|
| Surfactant FK | 0.2 parts |
| Cross linking agent (shown in Table 4) | 2 parts |
| <Third layer coating composition for ink receiving layer> | |
| Gelatin (isoelectric point 8.0 produced by Stoes Corporation) | 50 parts |
| PVP-K90 (produced by BASF Co., Ltd.) | 25 parts |
| PEG 150000 Arcox R150 (produced by Meisei Kagaku Co., Ltd.) | 25 parts |
| <Second layer coating composition for ink receiving layer> | |
| Gelatin (isoelectric point 8.0 produced by Stoes Corporation) | 40 parts |
| PEG 150000 Arcox R150 (produced by Meisei Kagaku Co., Ltd.) | 10 parts |
| Nonion-modified polyvinyl alcohol OKS-9162 (produced by Nihon Gosei Kagaku Co., Ltd.) | 25 parts |
| Cationic polymer NK-100PM (produced by Nihon Shokubai Co., Ltd.) | 15 parts |
| <First layer coating composition for ink receiving layer> | |
| Gelatin (isoelectric point 8.0 produced by Stoes Corporation) | 50 parts |
| Nonion-modified polyvinyl alcohol OKS-9162 (produced by Nihon Gosei Kagaku Co., Ltd.) | 30 parts |
| Cationic polymer NK-100PM (produced by Nihon Shokubai Co., Ltd.) | 20 parts |

Using an ink jet printer and an exclusive ink, an image was recorded on the samples obtained above, and evaluated in the same manner as in Example 18. Further, the following evaluation was carried out.

Evaluation of Glossiness at Image Portions

The black image K was observed and its glossiness was evaluated according to the following evaluation criteria:

Evaluation Criteria

A: The image was uniform and good, and had the same glossiness as non-image portions.

B: Glossiness of the image is slightly inadequate, but no practical problems.

C: Glossiness is lowered at a part of the image.

D: Glossiness of the image is too low to be of practical use.

The results of Examples 28 to 32 are shown in Table 4.

TABLE 4

| Example (Sample No.) | 28 | 29 | 30 | 31 | 32 |
|---|---|---|---|---|---|
| Cross-linking agent ($g/m^2$) | — | Cross-linking agent 1 0.2 | Exemplified compound (1) 0.2 | Exemplified compound (3) 0.2 | Exemplified compound (6) 0.2 |
| Layer swelling amount ($cc/m^2$) | 143 | 45 | 50 | 48 | 47 |
| Layer dissolving time (minute) | 5 | not less than 60 | not less than 60 | not less than 60 | not less than 60 |
| Ink absorption and drying property | A | A | A | A | A |
| Density unevenness | A | B | B | A | A |
| Water resistance | D | A | A | A | A |
| Light fastness | B | A | A | A | A |
| Image blurring under high humidity | B | A | A | A | A |
| Image water resistance | D | B | B | B | B |
| Image glossiness | B | C | A | A | A |
| Remarks | Comp. | Inv. | Inv. | Inv. | Inv. |

As is apparent from Table 4, the inventive ink-jet recording sheet samples, which comprises the image receiving layer having the layer swelling amount and the layer dissolving time in the invention, and further containing a carbamoyl pyridinium compound, provide more excellent results of the invention and improved image glossiness.

What is claimed is:

1. A recording sheet for ink-jet recording comprising a support, and provided on one side of the support, an ink receiving layer containing gelatin, a cross-linking agent selected from the group consisting of aldehyde compounds, ketone compounds, a triazine compound, reactive halogen-containing compounds, divinylsulfone, a carbamoyl pyridinium compound, reactive olefin-containing compounds, N-methylol compounds, isocyanates, aziridine compounds, carbodiimides, epoxy compounds, a halogencarboxyaldehyde, a dioxane derivative, chromium alum, potash alum, zirconium sulfate and boric acid, and a water soluble polymer other than gelatin selected from the group consisting of polyvinyl alcohol, polyvinyl pyrrolidone, polyvinyl pyridinium halide, modified polyvinyl alcohol, an acryl group-containing polymer, starch, oxidation starch, carboxylated starch, dialdehyde starch, cationated starch, dextrin, sodium alginate, gum arabic, casein, pullulan, dextrane, methylcellulose, ethylcellulose, carboxymethylcellulose, hydroxypropylcellulose, a polyalkylene glycol, polyvinyl ether, polyglycerin, maleic acid-alkylvinylether copolymer, maleic acid-N-vinylpyrrole copolymer, styrene-maleic anhydride copolymer, and polyethylene imine, wherein the layer swelling amount of the ink receiving layer is 20 to 500 $cc/m^2$, and the layer solubility time of the ink receiving layer is 10 minutes or more.

2. The recording sheet for ink-jet recording of claim 1, wherein the ink receiving layer further contains a fluorine containing surfactant.

3. The recording sheet for ink-jet recording of claim 1, wherein the ink receiving layer contains basic latex or a cationic water soluble polymer.

4. The recording sheet for ink-jet recording of claim 1, wherein the cross-linking agent is at least one selected from triazine compounds and carbamoyl pyridinium compounds.

5. The recording sheet for ink-jet recording of claim 4, wherein the carbamoyl pyridinium compound is represented by the following formula I:

formula I

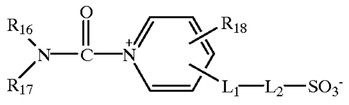

wherein $R_{16}$ and $R_{17}$ independently represent an alkyl group or an aryl group, provided that $R_{16}$ and $R_{17}$ may combine with each other to form a ring; $R_{18}$ represents a hydrogen atom or a monovalent substituent; and $L_1$ and $L_2$ independently represent a divalent linkage group.

6. The recording sheet for ink-jet recording of claim 1, wherein the cross-linking agent content of the ink receiving layer is 0.01 to 10 g based on 100 g of the ink receiving layer.

7. The recording sheet for ink-jet recording of claim 1, wherein the coating amount of the ink receiving layer is 8 to 100 g/m$^2$.

8. The recording sheet for ink-jet recording of claim 1, wherein the support is a film or a resin-covered paper in which both sides of paper are covered with a resin.

9. The recording sheet for ink-jet recording of claim 8, wherein the sheet has a Taber stiffness of 1 to 15 g.cm.

10. The recording sheet for ink-jet recording of claim 1 wherein the coating amount of the ink receiving layer is 8 to 100 g/m$^2$.

11. An ink jet recording method comprising the step of:

jetting ink containing 40 weight % or more of water on the recording sheet of claim 1 the sheet comprising a support, and provided on one side of the support, an ink receiving layer, wherein the layer swelling amount of the ink receiving layer is 20 to 500 cc/m$^2$, and the layer solubility time of the ink receiving layer is 10 minutes or more.

12. The ink jet recording method of claim 11, wherein the maximum jetting amount of the ink is 40 to 60 g/m$^2$.

* * * * *